(12) United States Patent
Yang

(10) Patent No.: US 6,681,930 B1
(45) Date of Patent: Jan. 27, 2004

(54) MULTIMEDIA STORAGE CASE

(76) Inventor: Yuan Tang Yang, P.O. Box 26-757, Taipei (TW), 106

( * ) Notice: Subject to any disclaimer, the term of this patent is extended or adjusted under 35 U.S.C. 154(b) by 0 days.

(21) Appl. No.: 10/207,337

(22) Filed: Jul. 24, 2002

(51) Int. Cl.[7] .............................................. B65D 85/57
(52) U.S. Cl. ..................................... 206/310; 206/308.1
(58) Field of Search ...................... 206/308.1, 310–313, 206/493, 309

(56) References Cited

U.S. PATENT DOCUMENTS

| | | | | |
|---|---|---|---|---|
| 5,988,375 | A | * | 11/1999 | Chang ...................... 206/308.1 |
| 6,123,192 | A | * | 9/2000 | Rufo, Jr. ..................... 206/310 |
| 6,293,396 | B1 | * | 9/2001 | Takahashi et al. .......... 206/310 |
| 6,354,435 | B1 | * | 3/2002 | Belden et al. .............. 206/310 |
| 6,364,108 | B1 | * | 4/2002 | Bin ............................. 206/310 |
| 6,412,631 | B2 | * | 7/2002 | Belden, Jr. ............... 206/308.1 |
| 6,478,150 | B1 | * | 11/2002 | S.o slashed.lling ...... 206/308.1 |
| 6,523,685 | B1 | * | 2/2003 | Rufo et al. ................. 206/310 |

* cited by examiner

*Primary Examiner*—Luan K. Bui
(74) *Attorney, Agent, or Firm*—Rosenberg, Klein & Lee

(57) ABSTRACT

A multimedia storage case structure comprises a case and a holder mounted within the case. The holder includes an elevating base and a snap boss thereon. The elevating base has first and a second resilient lips that are separated from each other via a plurality of grooves. The first and second lips bend toward a center of the holder and protrude upward to form the snap boss. A first portion of the snap boss, connected to the first lip, includes a claw and further bend toward the center of the holder to terminate in a top pressing cap that centrally overlies the snap boss meanwhile being spaced away by a gap from a second portion of the snap boss connected to the second lip.

4 Claims, 4 Drawing Sheets

MULTIMEDIA STORAGE CASE

BACKGROUND OF THE INVENTION

1. Field of the Invention

The invention relates to a multimedia storage case and, more particularly, to a snap fit holder that allows convenient withdrawal and placement of an optical disc in the case.

2. Description of the Prior Art

A multimedia storage case is traditionally used to store an optical disc.

FIG. 1 is a perspective view that illustrates a holder 1*a* conventionally provided at a central area of the storage case (not shown) to hold the optical disc. The traditional holder 1*a* usually comprises a cylindrical pillar 10*a* that is formed from a plurality of resilient lips 11*a* that radially extend. The lips 11*a* bend upward to form a snap portion 12*a* that has a curved shape on which is provided a claw 13*a*. The claw 13*a* snap fits with the central hole of the optical disc. The snap portion 12*a* further bends toward a center to form a pressing portion 14*a*. The lips 11*a* are respectively include a slit 15*a* and are separated from one another via a plurality of Y-shaped grooves 16*a* to enable a move of the lips 11*a*.

To store the optical disc in the case, the user places the central hole of the optical disc in alignment on the cylindrical pillar 10*a* and presses down the optical disc to snap fit the claw 13*a* with the central hole of the optical disc. When the optical disc has to be taken out, the user presses on the pressing portion 14*a* to incline and disengage the claw 13*a* from the central hole of the optical disc that, subsequently, can be taken out.

The above structure of the holder 1*a* needs the exertion of a relatively important push on the pressing portion 14*a* to disengage the claw 13*a*, which may be cumbersome to the user and hurt the user's fingers. Furthermore, the placement of the optical disc in the traditional case usually produces a frictional contact, which material abrasion.

SUMMARY OF THE INVENTION

It is therefore a principal object of the invention to provide a multimedia storage case structure that is provided with a top pressing cap that is connected to a single resilient lip, which requires less pressing force to disengage the optical disc.

It is another object of the invention to provide a multimedia storage case structure that is provided with an elevating base under the snap portion to prevent the data area of the optical disc from contacting the bottom surface of the case. Thereby, damageable abrasion of the data area of the optical disc is prevented.

To accomplish the above and other objectives, a multimedia storage case structure of the invention comprises a case and a holder mounted within the case. The holder includes an elevating base and a snap boss thereon. The elevating base has first and a second resilient lips that are separated from each other via a plurality of grooves. The first and second lips bend toward a center of the holder and protrude upward to form the snap boss. A first portion of the snap boss connected to the first lip includes a claw and further bend toward the center of the holder to terminate in a top pressing cap that centrally overlies the snap boss meanwhile being spaced away by a gap from a second portion of the snap boss connected to the second lip.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
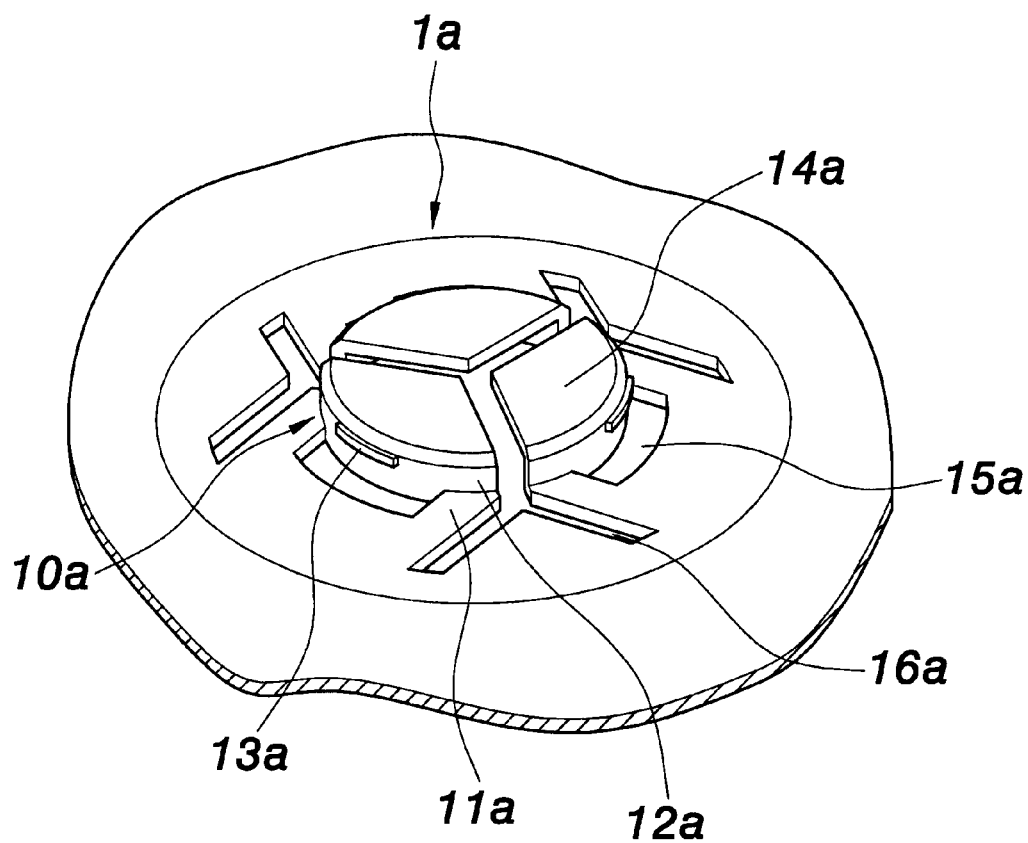
FIG. 1 is a perspective view schematically illustrating a traditional holder of optical disc storage case of the prior art.

Wherever possible in the following description, like reference numerals will refer to like elements and parts unless otherwise illustrated.

Figure 2:
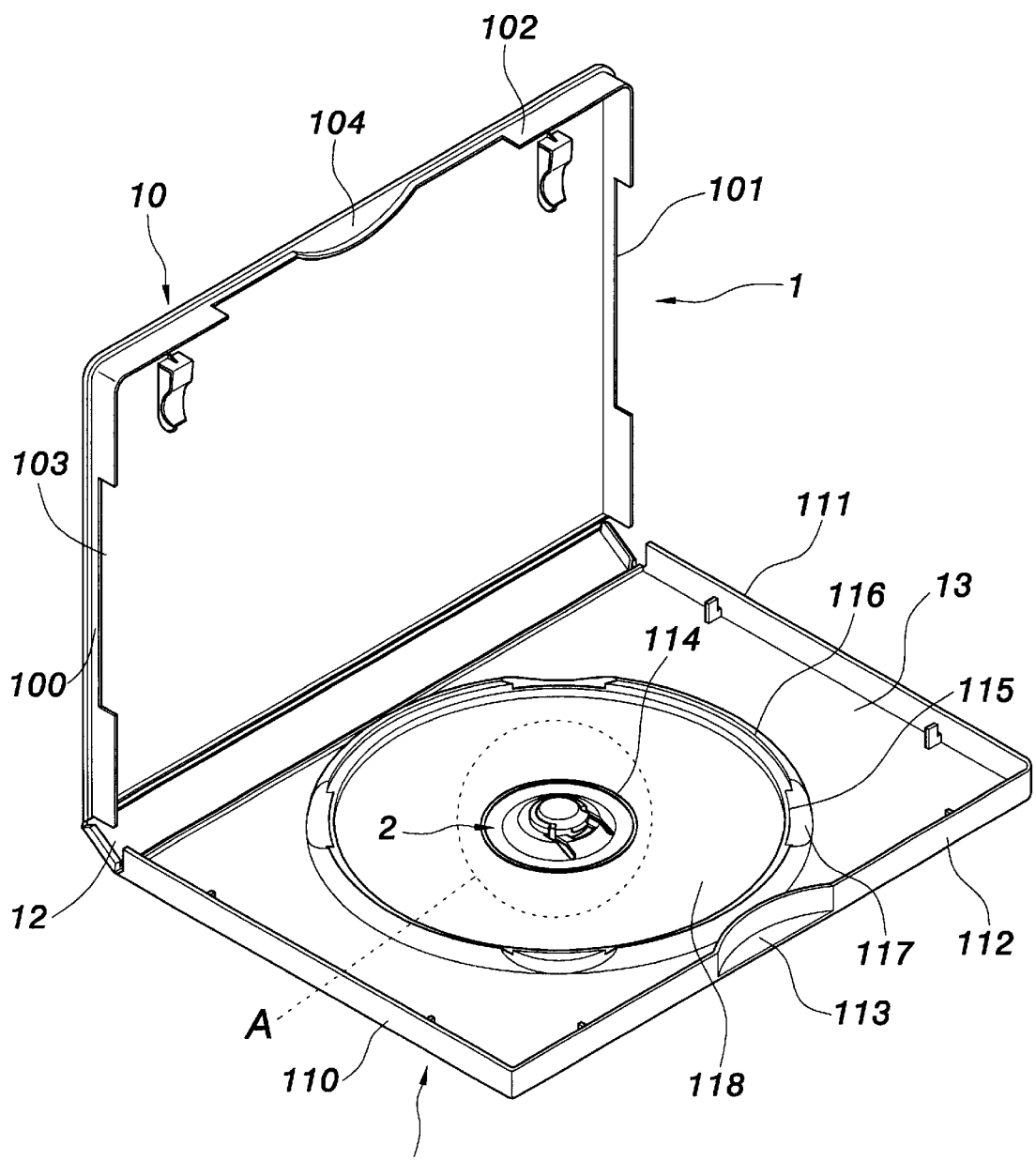
FIG. 2 is a perspective view schematically illustrating a multimedia storage case according to an embodiment of the invention.
Figure 2A:
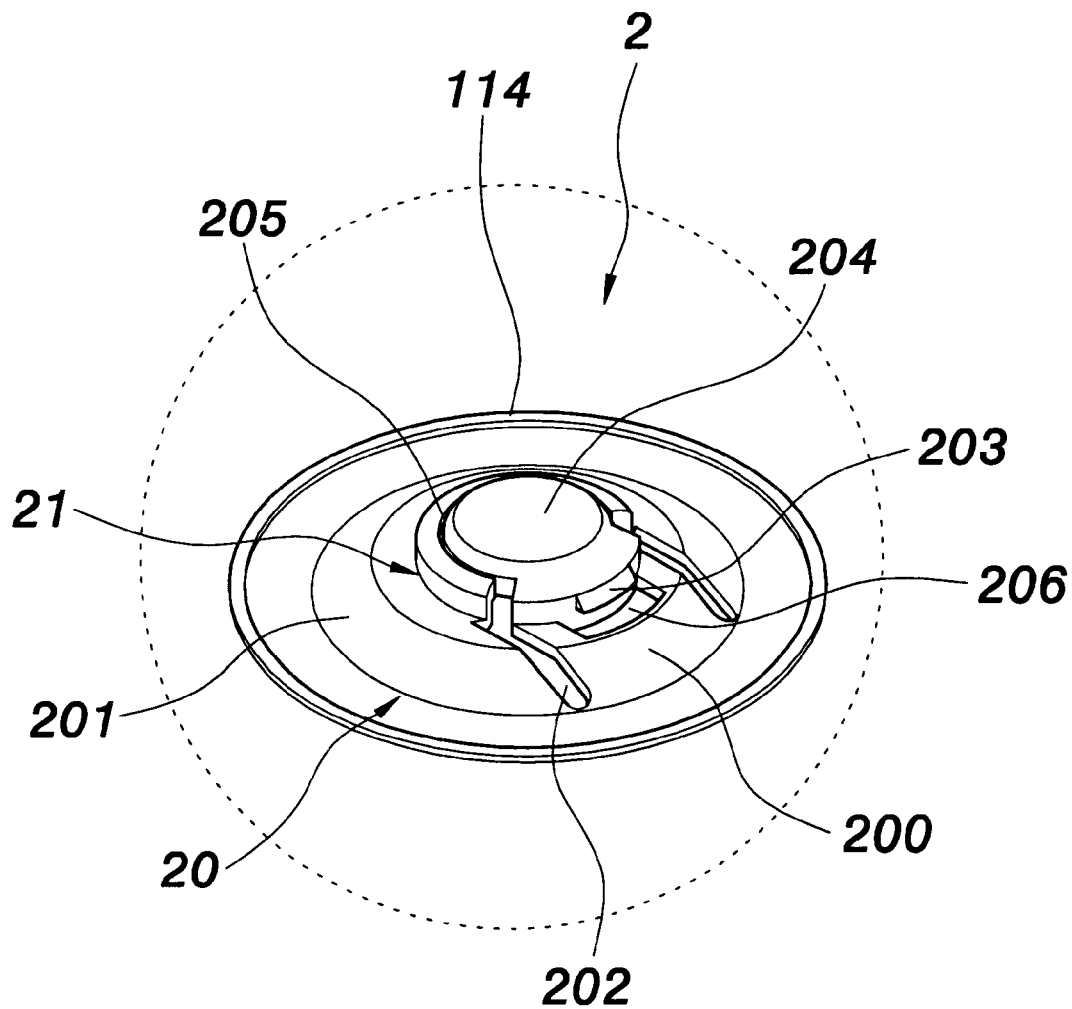
FIG. 2A is a locally enlarged view of a holder within the multimedia storage case according to an embodiment of the invention.
Figure 3:
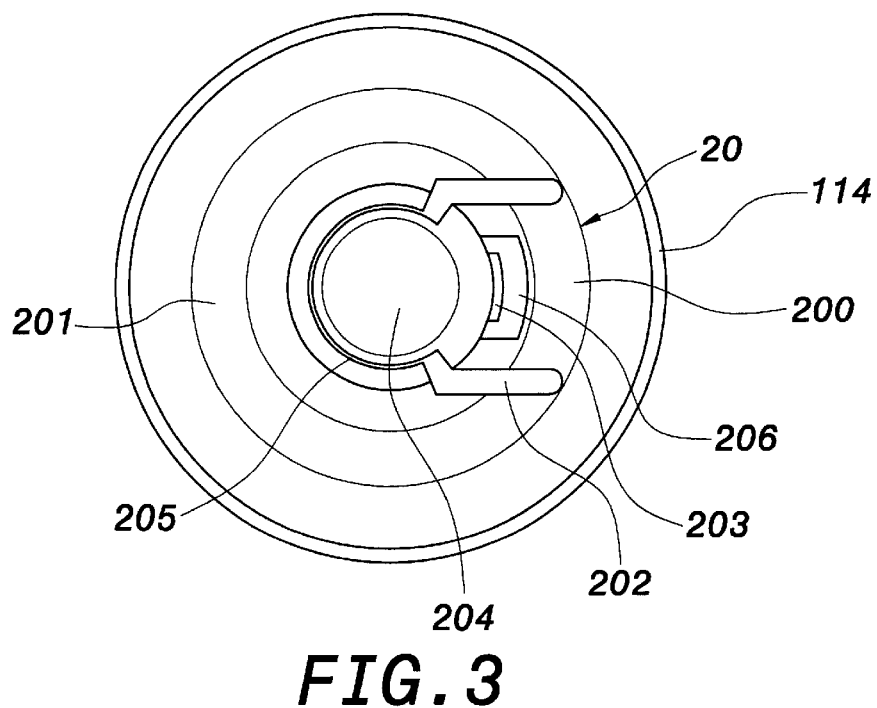
FIG. 3 is a locally enlarged top view of an embodiment of the invention
Figure 4:
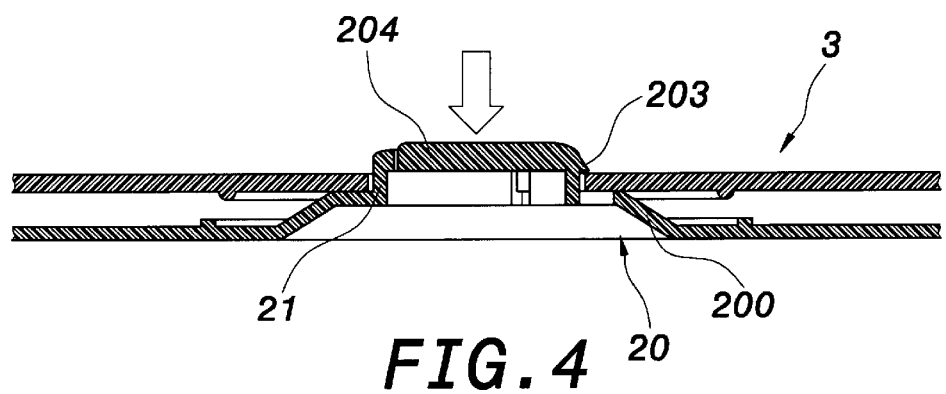
FIG. 4 is a sectional view of an embodiment of the invention.
Figure 5:
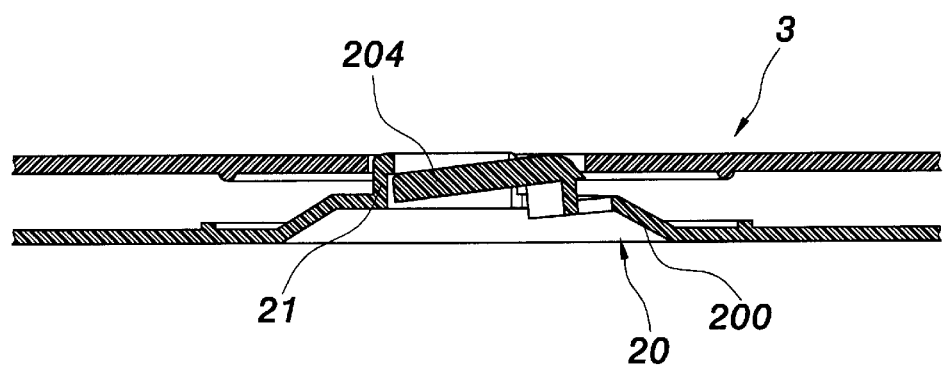
FIG. 5 is a schematic view showing the operation of the holder of the multimedia storage case according to an embodiment of the invention.

Referring to FIG. 2, FIG. 2A, FIG. 3 and FIG. 4, the invention provides a multimedia storage case structure that comprises a case 1 and a holder 2 for holding an optical disc 3 in the case 1. The case 1 comprises a cover 10 connected to a tray 11 via a binder 12 through which the cover 10 and the tray 11 can be folded and unfolded relative to each other. The binder 12 may be formed, for example, with the cover 10 and tray 11 in a single body. The cover 10 includes a front sidewall 100, a rear sidewall 101 and a lateral sidewall 102. Each of the sidewalls 100, 101, 102 respectively includes central notches 103. The lateral sidewall 102 is further centrally provided with a tongue 104 for finger opening.

The tray 11 includes a front flap segment 110, a rear flap segment 111 and a lateral flap segment 112 that together form a U-shaped frame. The lateral flap segment 112 is centrally provided with a recessed cavity 113. When the cover 10 folds onto the tray 11, a first receiving space 13 is defined within the case 1, the flap segments 110, 111, 112 of the tray 11 outwardly double over the sidewalls 100, 101, 102 of the cover 10, and the tongue 104 engages the recessed cavity 113.

The holder 2 is fixedly arranged at a central area of the tray 11. Around the holder 2 are respectively formed a central protruding ring 114 and a peripheral protruding ring 115 that concentric to the holder 2. The peripheral protruding ring 115 comprises a plurality of arcs 116 that are alternated with a plurality of access notches 117. The arcs 116 are located outside the recording area of the optical disc 3 when this latter is placed on the tray 11, the height of the arcs then being approximately equal to that of the disc 3. The arcs 116 inwardly define a second receiving space 118 where is placed the optical disc 3. The central protruding ring 114 is located within the recording area of the optical disc 3 around the holder 2.

The holder 2 comprises an elevating base 20 that extends upward in a snap boss 21. The elevating base 20 is formed from first and second resilient lips 200, 201 between which are defined a plurality of grooves 202. Along a direction perpendicular to the tray 11, the lips 200, 201, successively, extend conical, bend toward a center of the holder 2, and protrude upward to form the snap boss 21 with an approximately cylindrical shape. The snap boss 21 is composed of first and second portions that are respectively connected to the first and second lips 200, 201. The first portion of the snap boss 21 further includes at least a claw 203 that retains the optical disc 3 outside the central hole thereof when the optical disc 3 is snap fitted with the snap boss 21.

The first portion of the snap boss 21, connected to the first lip 200, bends toward a center of the holder to terminate in a top pressing cap 204 that centrally overlies the cylindrical snap boss 21. A gap 205 therefore is formed between the top pressing cap 204 and the underlying second portion of the snap boss 21 connected to the second lip 201. A slit 206 is further defined within a region of the first lip 200 proximate to the connection with the snap boss 21. The grooves 202 between the first and second lips 200, 201 enable a relative move of the first lip 200 relative to the second lip 201.

To place the optical disc 3 in the case 1, the user places the central hole of the optical disc 3 on the snap boss 21 and lightly presses on the optical disc 3. As a result, the snap boss 21 snap fits with the central hole of the optical disc 3 and the claw 203 pushes outside the central hole to retain the optical disc 3. A central region of the optical disc 3 therefore rests on the elevating base 20 while an outer edge of the optical disc 3 is supported on the peripheral protruding ring 115. A peripheral region of the optical disc 3 therefore lies in the second receiving space 118 delimited by the arcs 116.

If the user wishes to take the optical disc 3, she/he lightly presses down the top pressing cap 204. As a result, the claw 203 resiliently inclines toward a center of the snap boss 21 and disengages from the central hole of the optical disc 3 that then can be taken out.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A multimedia storage case for storing an optical disc, comprising:

a case; and a holder, disposed within the case, the holder including an elevating base and a snap boss thereon, the elevating base having a first and a second resilient lips that are separated from each other via a plurality of grooves, the first and the second resilient lips bending toward a center of the holder and protruding upward to form the snap boss, a first portion of the snap boss being disposed on the first resilient lip having a claw formed to extend radially outward therefrom, the first portion of the snap boss further having a top pressing cap formed to extend radially inward therefrom to be suspended centrally relative to the snap boss and spaced by a gap from a second portion of the snap boss of the second resilient lip;

the second portion of the snap boss defining a smooth arcuate segment extending continuously about a free end of the top pressing cap extending from the first portion of the snap boss for slidably receiving an optical disc coaxially thereabout.

2. The case structure of claim 1, wherein the case comprises a cover and a tray, the tray being provided with a peripheral protruding ring at an outer side of which are connected a plurality of arcs, the peripheral protruding ring being outside a recording area of the optical disc being placed in the case, and the arcs each having a height sufficient to evenly support the optical disc when snap fitted with the holder.

3. The case structure of claim 1, wherein the elevating base is approximately conical.

4. The case structure of claim 1, wherein the first resilient lip further inwardly includes a slit.

\* \* \* \* \*